March 20, 1945.   J. C. COX   2,371,952
MOTOR AND BRAKE ASSEMBLY
Filed Sept. 29, 1943   2 Sheets-Sheet 1

INVENTOR
JOHN C. COX
BY
ATTORNEY

March 20, 1945.            J. C. COX                 2,371,952
                    MOTOR AND BRAKE ASSEMBLY
              Filed Sept. 29, 1943         2 Sheets-Sheet 2

INVENTOR
JOHN C. COX
BY
ATTORNEY

Patented Mar. 20, 1945

2,371,952

UNITED STATES PATENT OFFICE 2,371,952

MOTOR AND BRAKE ASSEMBLY

John C. Cox, Ladue, Mo., assignor to Wagner Electric Corporation, St. Louis, Mo., a corporation of Delaware Application September 29, 1943, Serial No. 504,229

7 Claims. (Cl. 188—151)

My invention relates to an improved motor and brake assembly, the principal object being to so associate a brake with the end member or plate of an electric motor that an enclosed assembly will be provided and also one which will be efficiently cooled by air circulating means associated with the brake drum.

Figure 1:
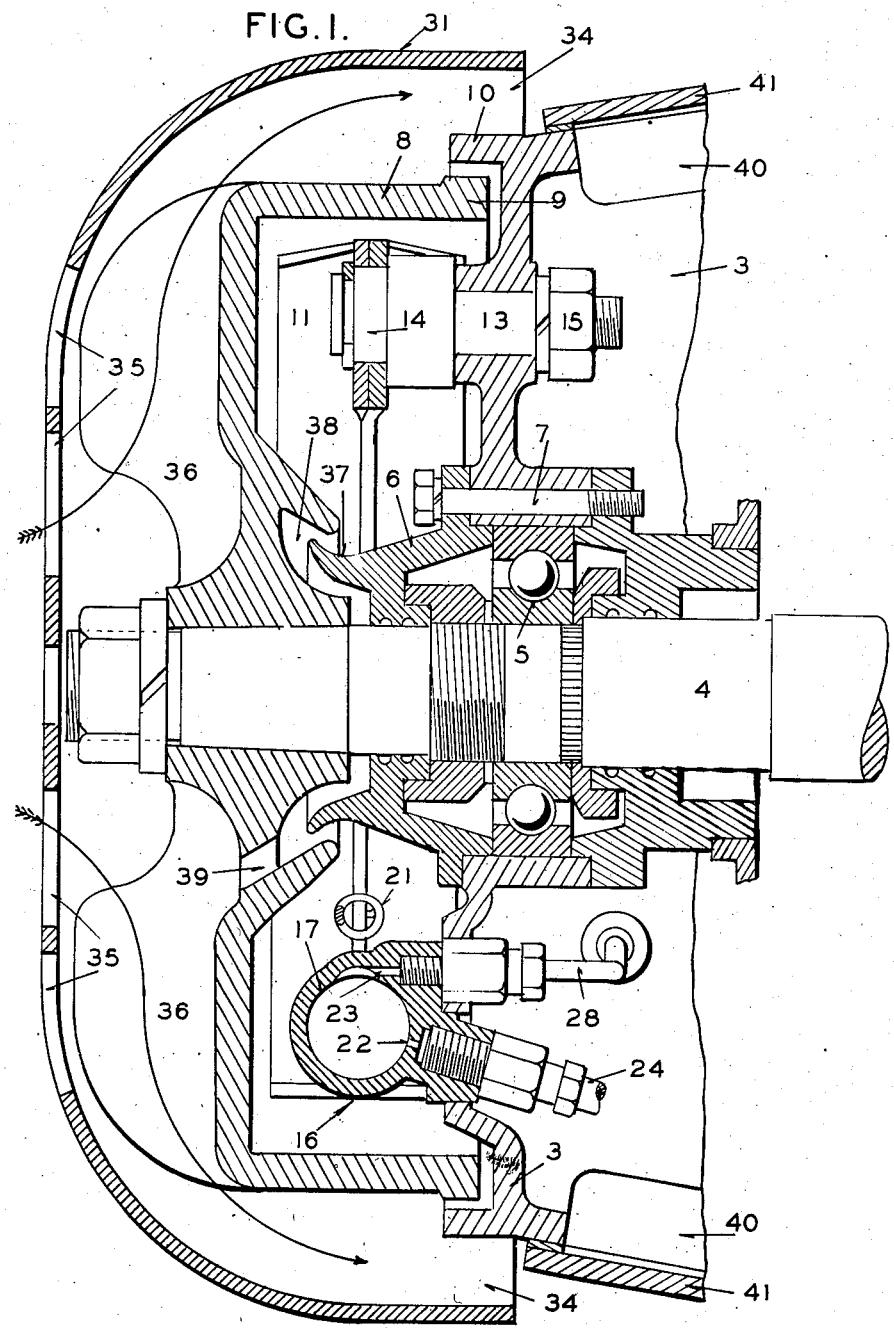
Figure 2:
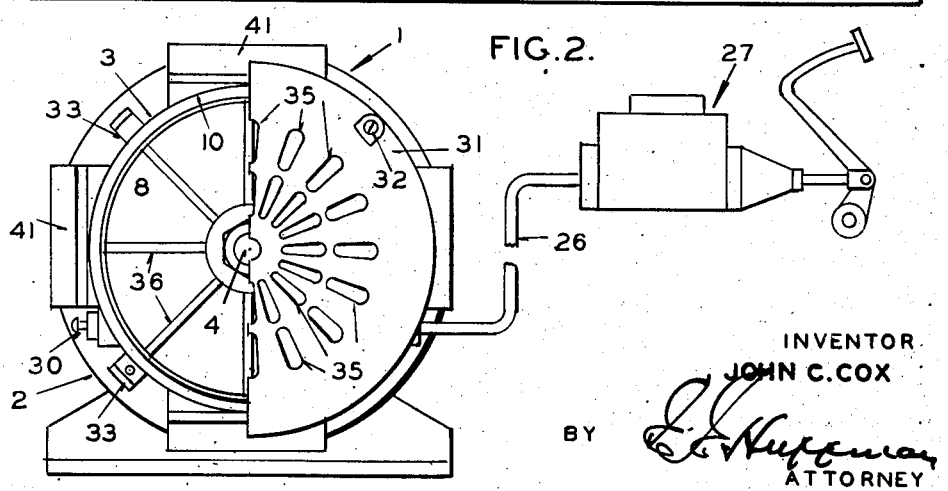

Other objects of my invention will become apparent from the following description taken in connection with the accompanying drawings in which Figure 1 is a sectional view of a portion of an end of an electric motor showing a brake associated therewith in accordance with my invention; Figure 2 is an end view of the assembly, with part of the cover plate broken away; and Figure 3 is another end view with the cover plate and brake drum removed to show the brake shoes.

Referring to the drawings in detail, numeral 1 indicates an electric motor provided with the usual housing 2. This housing has secured to one end thereof an end enclosure member or plate 3 of general cup-shaped formation. The shaft 4 of the rotor of the motor is journaled in the end member and extends to the exterior thereof. The bearing 5 of the shaft is carried by the end member and held on the shaft against axial movement in a well-known manner. The bearing is enclosed on the exterior side of the end member of the motor by means of a cover 6 surrounding the shaft and secured to the end member by bolts 7.

The outer end of the shaft, which extends beyond the end member, has secured thereto a cup-shaped brake drum 8, the open side of which faces toward the end member. The edge 9 of the rim portion of the drum is adapted to lie within an annular flange 10 carried by the end member, thus producing a relationship which will prevent any dirt or foreign material from readily falling into the drum.

Figure 3:
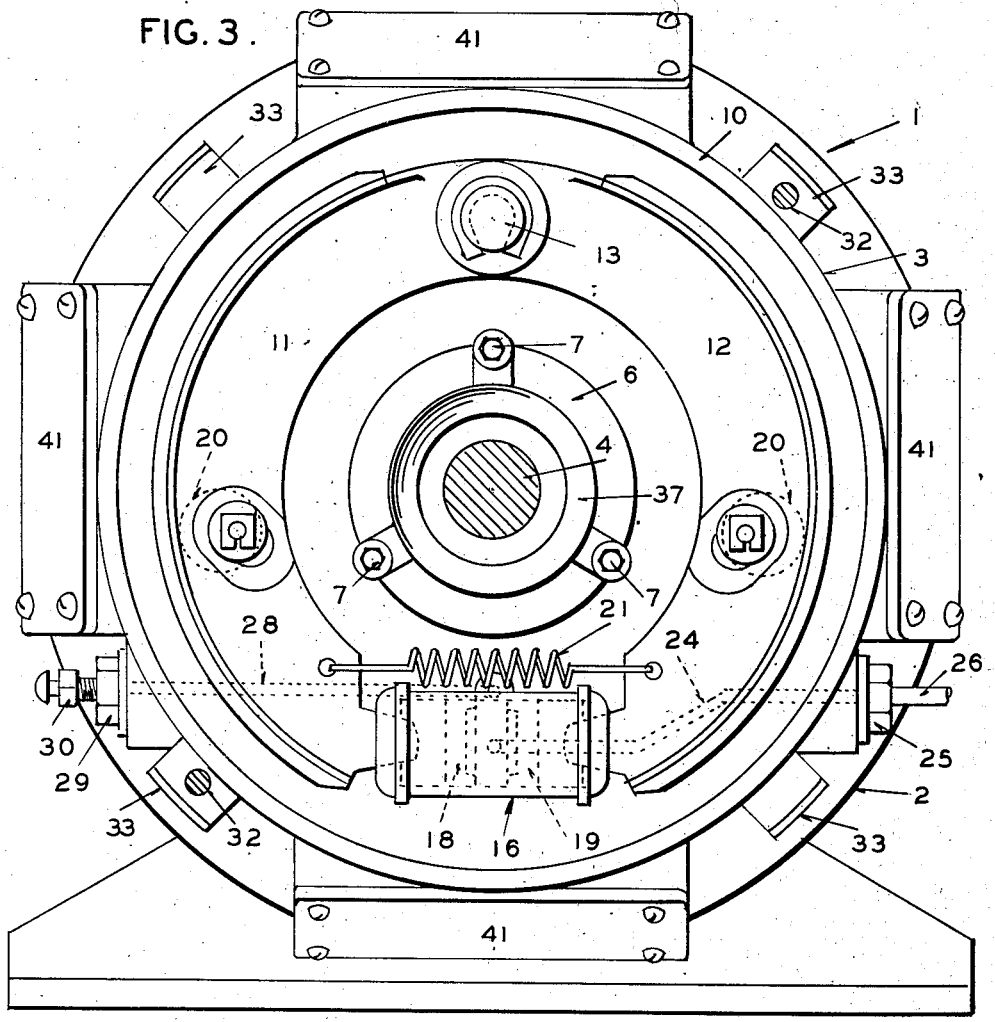

As best shown in Figure 3, the internal cylindrical surface of the rim portion of the drum has cooperating therewith two brake shoes 11 and 12. The upper ends of these brake shoes are pivotally mounted on an anchor pin 13 secured to the end member. This anchor pin has an eccentric portion 14 upon which the shoes are pivoted, thus permitting the ends to be adjusted by a rotation of the anchor pin when the clamping nut 15 is loosened and pin 13 rotated. The lower ends of the shoes are adapted to be actuated into engagement with the rim of the drum by means of a fluid motor 16 which comprises a cylinder 17 and opposed pistons 18 and 19 for cooperation with the shoe ends. The shoes are retracted against stops 20 by a retracting spring 21.

The fluid motor is mounted on the end member of the electric motor and, as shown in Figure 1, is provided with an inlet hole 22 and a bleeder hole 23. The inlet hole has connected thereto a conduit 24 for conducting fluid to the motor and this conduit extends to the side of the electric motor end member where it is secured thereto by fitting means 25 also employable for connecting it to another conduit 26 coming from a suitable source of hydraulic pressure such as, for example, the master cylinder 27 (Figure 2). The bleeder hole 23 is connected to a conduit 28 which extends to the opposite side of the end member where it is secured thereto by suitable fitting means 29. Associated with this fitting is a bleeder valve in the form of a screw 30 normally closing the conduit. Fluid is permitted to flow out of the conduit when screw 30 is unscrewed, thus permitting the bleeding of the wheel cylinder to free it from any air which may be trapped during filling or at any other time.

The drum and the brake shoes are enclosed by a cup-shaped cover 31 which is secured to the end member 3 by bolts 32. The end member is provided with spaced ears 33 for cooperation with the lip portion of the cover to properly position the cover and maintain a gap 34 between said lip portion of the cover and the flange portion 10 within which the rim edge of the drum is received. The bottom portion of the cover adjacent the backing portion of the drum is provided with perforations 35 to permit entry of air into the cover. In order that air may be circulated through the cover and over the outer surface of the backing and rim of the brake drum from the perforations 35 to the gap 34, the drum is provided with a plurality of radially extending fins 36 integral with the outer surface of the backing portion of the drum. Thus the drum, which is continuously rotating with the motor shaft, will also act as a blower wheel and pull air in through the perforations and force it out of the gap 34 as indicated by the arrows. This will cause a cooling of the drum and insure that heat developed by braking will be quickly dissipated.

In order to insure against any grease which may become expelled from the bearing 5 for the shaft getting on the brake shoe linings and thus decrease their coefficient of friction, the drum and bearing cover 6 are arranged to catch and dispose of this grease. To accomplish this, cover 6 is provided with an annular flange 37 which is adapted to project into an annular recess 38 in the backing portion of the drum adjacent the hub. The flange 37 is flared outwardly so that any grease coming from the bearing will be thrown into recess 38 and the recess is arranged with its mouth closer to the axis of the shaft than its bottom portion so as to pocket the grease coming off the flange. The bottom of the pocket is connected with holes 39 leading to the exterior of the drum so that grease caught in the recess will be thrown into cover 31 where it will be free to run out through gap 34.

In order that there may be free access to the interior of the electric motor end member 3 from all directions, this end member is provided with a plurality of openings 40 having cover plates 41.

From the foregoing description the operation of my combined motor and brake is believed to be obvious. To apply the brake all that need be done is to force fluid under pressure in fluid motor 16, thereby expanding the brake shoes. When the fluid pressure is released, the brakes will be released by means of the retracting spring 21. The brake is continuously cooled by the circulation of air caused by the fins on the drum. The brake shoes are rigidly mounted on the end member of the electric motor. The drum and fins are protected by the cover plate 31 so that there will be no chance of any injury from the rotating drum. Also, the arrangement is such that any grease which may be expelled from the electric motor shaft bearing will be removed without coming in contact with the linings of the brake shoes. The fluid motor can be connected to the master cylinder device by merely attaching a conduit to a fitting on the side of the end member of the electric motor. Bleeding can also be accomplished by unscrewing a readily accessible bleeder valve on the opposite side of the end member of the electric motor.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In combination, an electric motor housing, an end member for the housing, said member also constituting the backing element for a brake device, a motor shaft journaled in the end member, a cup-shaped brake drum secured to the shaft with its open side positioned toward the end member and backing plate, brake friction means mounted on the end member and backing plate and within the drum for cooperation with the interior cylindrical surface of its rim, a hydraulic motor mounted on the end member and backing plate for actuating the friction means, conduit means extending through the end member and backing plate to conduct fluid under pressure to the hydraulic motor, and radially extending fins carried by the drum for causing a flow of air over the outer surface of the drum.

2. In combination, an electric motor housing, an end member for the housing having an outwardly extending annular portion, said end member forming the backing element for a brake device a motor shaft journaled in the end member and backing plate and extending to the exterior thereof, a cup-shaped brake drum secured to the exterior portion of the shaft with its open side positioned toward said backing element and the end of its rim portion projecting within the annular portion on said backing element, means providing radially positioned fins on the outer surface of the backing portion of the drum, brake shoes mounted on said backing element and positioned within the drum for cooperation with the interior surface of the drum rim, a hydraulic motor mounted on said backing element for actuating the brake shoes, conduit means connected to the hydraulic motor to conduct fluid thereto, and a cup-shaped cover enclosing the drum and fins and secured to said backing element, said cover being perforated opposite the fins to permit entry of air into the cover and its circulation over the drum by the fins.

3. In combination, an electric motor housing, a cup-shaped brake backing element for a brake also forming the end member for the housing, a motor shaft journaled in said backing element and extending to the exterior thereof, a cup-shaped brake drum secured to the exterior portion of the shaft with its open side positioned toward said backing element, means providing radially positioned fins on the outer surface of the backing portion of the drum, brake friction means mounted on the outer surface of said backing element and positioned in the drum for cooperation with the interior cylindrical surface thereof, a hydraulic motor mounted on the outer end surface of said backing element for actuating the friction means, conduit means extending from the hydraulic motor to the exterior of a side of said backing element to conduct fluid to said motor, and a cup-shaped cover plate enclosing the drum and fins and secured to said backing element, said cover plate being perforated at its bottom portion opposite the drum fins.

4. In combination, an electric motor housing, a cup-shaped backing member for a brake device also forming the end member for the housing, a motor shaft journaled in said backing member and extending to the exterior thereof, a cup-shaped brake drum secured to the exterior portion of the shaft with its open side positioned toward said backing member, brake friction means mounted on the outer surface of said backing member and positioned in the drum for cooperation with the interior cylindrical surface thereof, a hydraulic motor mounted on the outer end surface of said backing member for actuating the friction means, and conduit means extending from the hydraulic motor to the exterior of a side of said backing member to conduct fluid to said motor.

5. In combination, an electric motor housing, a cup-shaped backing member for a brake device also forming the end member for the housing, a motor shaft journaled in said backing member and extending to the exterior thereof, a cup-shaped brake drum secured to the exterior portion of the shaft with its open side positioned toward said backing member, brake friction means mounted on the outer surface of said backing member and positioned in the drum for cooperation with the interior cylindrical surface thereof, a hydraulic motor mounted on the outer end surface of said backing member for actuating the friction means, conduit means extending from the hydraulic motor to the exterior of a side of said backing member to conduct fluid to said motor, other conduit means extending from the hydraulic motor to the exterior side of said backing member, and a valve for said other conduit means accessible from the exterior of said backing member.

6. In combination, an electric motor housing, a backing member for a brake device also forming an end member for the housing, a motor shaft extending to the exterior of said backing member, a bearing in said backing member for the shaft, a cover plate for the bearing having an outwardly extending flared flange surrounding the exterior portion of the shaft, a cup-shaped brake drum secured to the exterior portion of the shaft with its open side positioned toward the end member, said drum being provided with an annular recess in its backing portion with its bottom positioned radially outwardly from its mouth and a passage from the bottom of the recess to the exterior of the drum, said recess receiving the flared flange, brake friction means mounted on said backing member and positioned in the drum for cooperation with the interior cylindrical surface thereof, and means for actuating the brake friction means mounted on said backing member.

7. In combination, an electric motor housing, an end member for the housing, a motor shaft extending to the exterior of the end member, a bearing in the end member for the shaft, a cover plate for the bearing having an outwardly extending flared flange surrounding the exterior portion of the shaft, a cup-shaped brake drum secured to the exterior portion of the shaft with its open side positioned toward the end member, said drum being provided with an annular recess in its backing portion with its bottom positioned radially outwardly from its mouth and a passage from the bottom of the recess to the exterior of the drum, said recess receiving the flared flange, brake friction means mounted on the end member and positioned in the drum for cooperation with the interior cylindrical surface thereof, means for actuating the brake friction means, means providing radially positioned fins on the outer surface of the backing portion of the drum, and a perforated cover plate for the drum and fins secured to the end member.

JOHN C. COX.